United States Patent Office 3,409,410
Patented Nov. 5, 1968

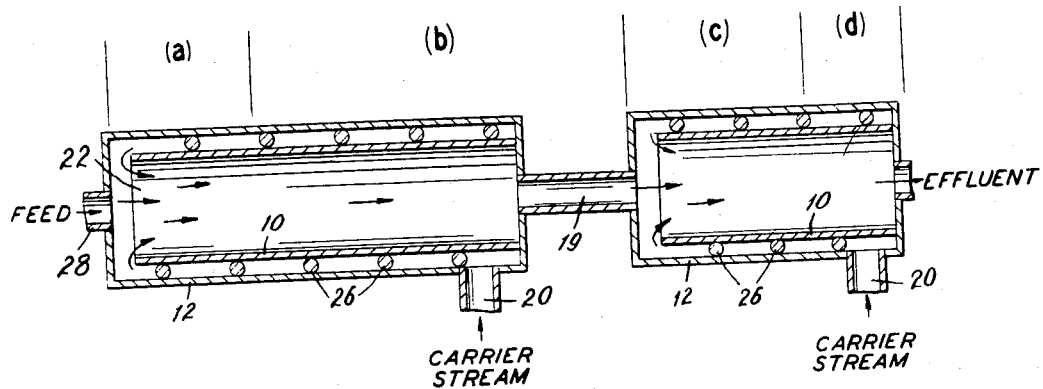
Fig. 2.
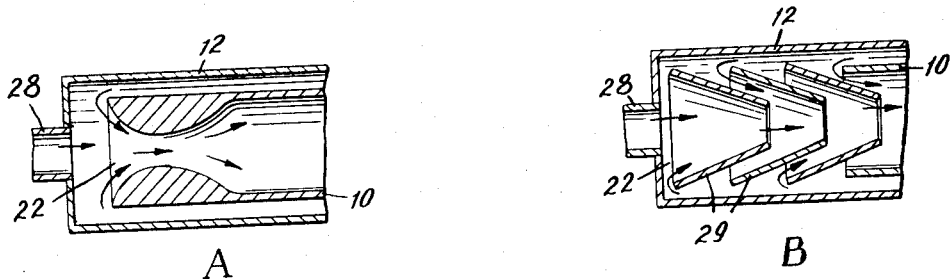
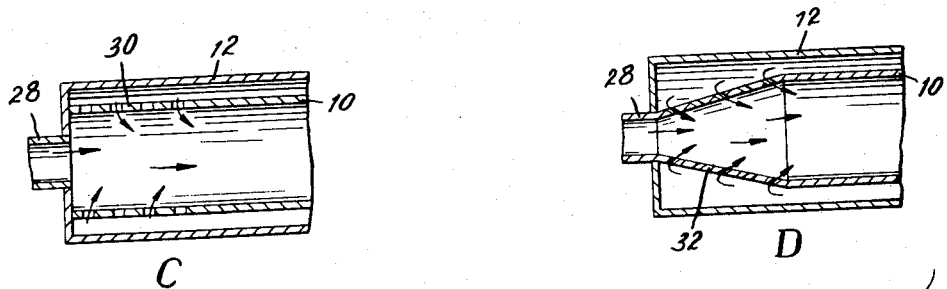
Fig. 3.

3,409,410
HIGH TEMPERATURE REACTOR PROVIDING A CONSTANT TEMPERATURE REACTION ZONE AND A FINAL ELEVATED TEMPERATURE REACTION ZONE
Sydney P. Spence, Westfield, Leonard M. Baker, Plainfield, Ulrich A. Steiner, North Plainfield, Larry Madestau, Martinsville, and Lester A. Rowe, Somerville, N.J., assignors to Union Carbide Corporation, a corporation of New York
Original application Mar. 26, 1964, Ser. No. 354,869, now Patent No. 3,311,668, dated Mar. 28, 1967. Divided and this application Oct. 18, 1966, Ser. No. 601,254
3 Claims. (Cl. 23—284)

ABSTRACT OF THE DISCLOSURE

A high temperature reactor useful in endothermic reactions comprising a multi-zoned tubular reaction chamber enveloped by an annular passageway through which a high temperature diluent flows counter-current to the flow of the reaction stream before mixing with the reaction stream.

---

This application is a division of U.S. application Ser. No. 354,869, filed Mar. 26, 1964 now Patent No. 3,311,-668.

This invention relates to apparatus for use in conjunction with high temperature processes. More particularly, this invention relates to apparatus useful in high temperature reactions requiring high reaction specificity.

Heretofore, most high temperature hydrocarbon cracking processes, i.e., about 800° C. to 1,500° C. were primarily dependent upon equilibrium decomposition states and the obtainment of structurally simple molecules as final products. Processes such as those for making ethylene, acetylene, synthesis gas, and the like, generally utilize long residence times and/or high feed partial pressures to achieve commercially attractive yields.

More recently however, the need for apparatus and processes capable of synthesizing specific and structurally complex molecules has developed necessitating greater refinement of control of reaction conditions. For example, the polymers of the xylylene family have been found to be highly desirable materials, especially in coating or encapsulating applications due to their unusual combination of thermal and chemical stability. Various methods of producing these polymers have been developed however, the most efficient method entails the pyrolytic conversion of the cyclic dimer, di-p-xylylene to the polymer. By this method a truly linear thermoplastic polymer is produced without interference from the formation of side products.

The cyclic dimer, di-p-xylylene (DPX) is however, a sterically hindered and strained molecule which is produced by a process involving the pyrolytic decomposition of p-xylene. The pyrolytic decomposition of p-xylene is capable of giving rise to the formation of a large number of possible primary and secondary decomposition products. For this reason, it is necessary to employ a thermal cracking reactor which promotes reaction specificity in order to obtain a useful raw material efficiency.

Accordingly, it is an object of this invention to provide a high temperature thermal cracking reactor which promotes reaction specificity.

It is another object of this invention to provide a thermal cracking reactor which provides essentially isothermal conditions in a radial direction and a closely controlled temperature profile in the direction of flow.

It is still another object to provide alloy compositions useful for high temperature applications of the type described herein.

It is a still further object to provide a process for the production of cyclic di-p-xylylene in high yields and efficiencies These and other objects are accomplished by the present invention which provides a high temperature reactor comprised of at least one stage, said stage being comprised of a multi-zoned reaction chamber enveloped by an outer shell to form an annular passageway therebetween. The reaction chamber is open at the feed end thereof and has an effluent outlet at the opposed end thereof. The enveloping shell has a feed inlet at one end thereof which is coaxial with the open feed end of the reaction chamber and a carrier stream inlet at the opposed end thereof entering said shell at a point proximately spaced from the effluent outlet of the reaction chamber enabling the carrier stream to flow in the annular passageway countercurrently to the direction of flow of the reaction stream in the reaction chamber thereby maintaining an essentially horizontal reaction temperature profile in the direction of flow of the reaction stream. The shell is secured to the reaction chamber at the effluent outlet thereof. The reaction chamber traverses substantially the length of the shell with the feed end thereof terminating closely adjacent to the feed inlet of the shell.

The present invention will become more apparent to persons familiar with this type of equipment and manufacturing process upon reading the following specification and referring to the accompanying drawings, wherein:

FIGURE 2 is a schematic illustration, in section of another embodiment contemplated within the present invention.

FIGURE 3 is a schematic illustration, in section, of various embodiments of the initial mixing zone of the reaction chamber of a high temperature reactor of the present invention.

Figure 1:
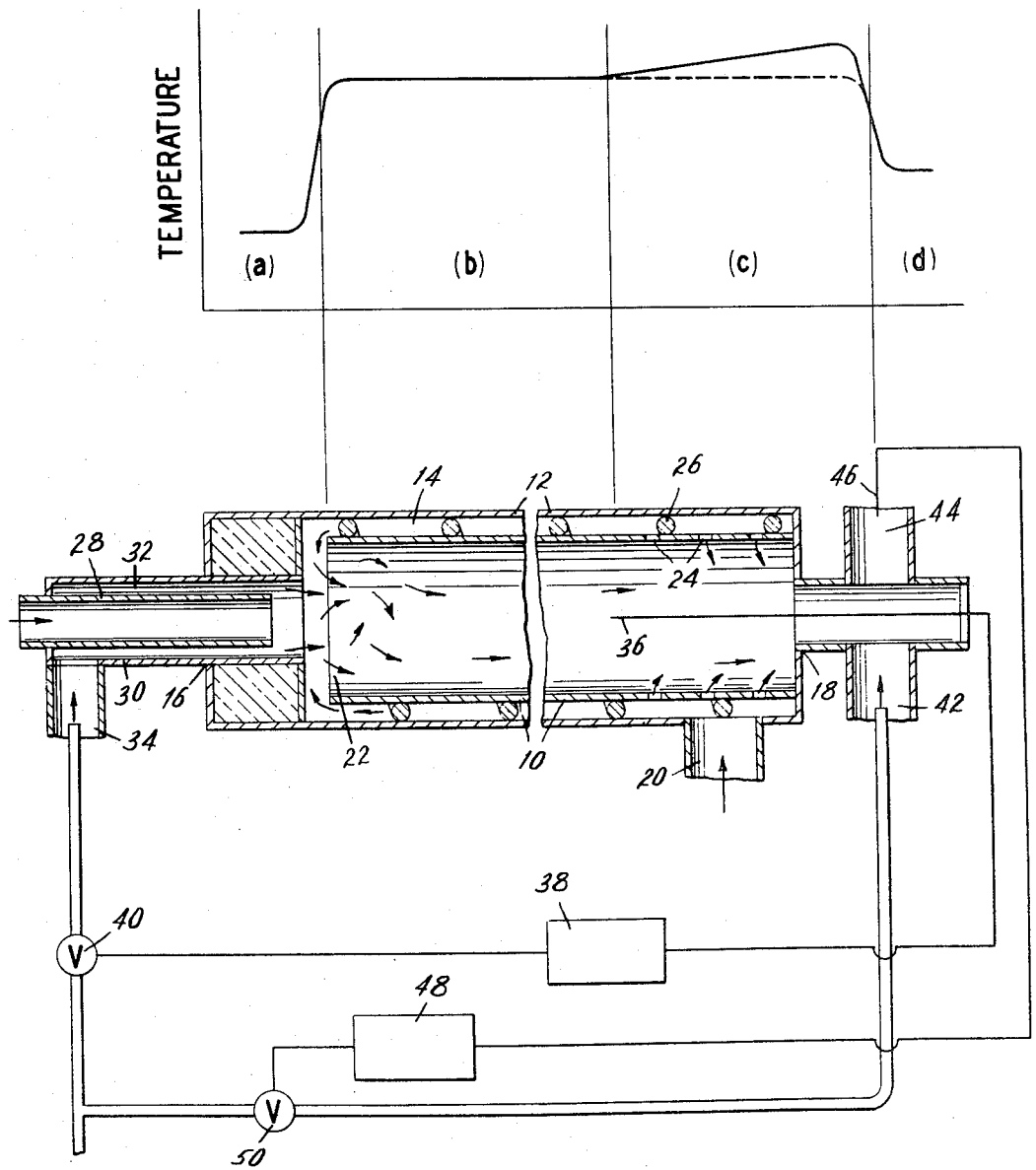
FIGURE 1 is a schematic illustration, in section, of one embodiment of the high temperature reactor of the present invention accompanied by a graph showing the highly specific and closely controlled longitudinal temperature profile within the high temperature reactor.

Referring now to FIGURE 1, there is shown one embodiment of a high temperature reactor contemplated within the present invention, said reactor comprised of a multi-zoned reaction chamber 10 enveloped by a shell 12 to form an annular passageway 14 therebetween. The reaction chamber 10 is open at the feed end 22 thereof and has an effluent outlet 18 at the opposed end thereof. The enveloping shell 12 has a feed inlet 16 at one end thereof which is coaxial with the open feed end 22 of the reaction chamber 10 and a carrier stream inlet 20 at the opposed end thereof entering said shell 12 at a point proximately spaced from the effluent outlet 18 of the reaction chamber 10 enabling the carrier stream to flow in the annular passageway 14 countercurrently to the direction of flow of the reaction stream in the reaction chamber 10 thereby maintaining an essentially horizontal reaction temperature profile in the direction of flow of the reaction stream. The shell 12 is secured to the reaction chamber 10 at the effluent outlet 18 thereof. The reaction chamber 10 traverses substantially the length of the shell 12 with the feed end 22 thereof terminating closely adjacent to the feed inlet 16 to the shell 12. The open feed end 22 of the reaction chamber 10 is coaxial with the feed inlet 16 to the shell and is proximately spaced therefrom to provide an initial mixing zone (a) for the incoming feed and counter-currently flowing carrier streams. After initial mixing, the reaction stream is passed into an intermediate reaction zone (b) and finally to a final reaction zone (c) situated proximate to the outlet end 18 of the reaction chamber. The final reaction zone is preferably perforated by a plurality of apertures 24 as illustrated by the preferred embodiment shown in FIG. 1 to provide direct injection of a portion of the carrier stream at its incoming conditions into the final reaction zone. Although the use of the plurality of apertures is highly desirable, the temperature profile within the reaction chamber can be maintained substantially horizontal or slightly rising in the absence of such perforations. A helically wound rod of high temperature material 26 is interposed between the reaction chamber 10 and the shell 12 to center and support said chamber although as is clear to those in the art, other suitable support means can easily be employed.

The present invention also provides means for maintaining close temperature control, i.e., ±2° C. of the temperature profile within the reaction chamber by injecting relatively cool steam into the reactor along with the feed. This is conveniently accomplished, as shown in FIGURE 1, by encompassing the feed conduit 28 with a second conduit 30 to form an annular passageway 32, therebetween. An inlet 34 in said second conduit provides entry for a stream of relatively cool steam which envelops the feed stream upon its entrance into the mixing portion (a) of the reaction chamber 10 thereby preventing decomposition of the undiluted feed stream upon contact with the hot reactor surfaces. The flow of the relatively cool steam can be automatically regulated to compensate for temperature deviations in the temperature profile within the reactor. For example, a servo regulator loop or other similar means can be employed which is generally comprised of a temperature sensing device, e.g., a thermocouple 36, within the reaction chamber 24 which senses deviations in the temperature profile within the reactor. The deviations are amplified by a signal amplifying means 38 which in turn feeds an impulse to a control valve 40 which modulates the flow of the cool steam to the inlet 34 of the second conduit 30. In this manner, any rise or fall within the reaction chamber 10 can immediately be compensated for by a change in the flow of cool steam thereby maintaining an essentially constant temperature profile within the reaction chamber. In the same manner, cool steam is injected through inlet 42 into the effluent stream up the efflux thereof from outlet 18 to arrest the gas phase reactions. The resultant stabilized gas mixture can then be passed through outlet 44 to further treatment. A temperature sensing device, e.g., thermocouple 46, within said outlet 44 is adapted to sense any deviations in the effluent stream temperature. The deviations are amplified by signal amplifying means 48 which in turn feeds an impulse to control valve 50 which regulates the flow of cool steam to the inlet 42.

In reactions requiring high reaction specificity, the temperature profile within the reaction chamber is of critical importance. It has been found in the present invention that the temperature profile can be maintained within ±2° C. for extended periods of operation at high temperatures. As shown in the accompaning graph in FIGURE 1, the reaction temperature is rapidly attained upon admixture of the feed and carrier streams in initial mixing zone (a). A horizontal or constant reaction temperature is maintained throughout the intermediate reaction zone (b). If the final reaction zone (c) is perforated by a plurality of apertures, a final heat kick is obtained in that zone. If said final reaction zone is not perforated, the temperature profile remains substantially horizontal (shown dotted). A rapid drop in temperature arresting the gas phase reaction is obtained upon the injection of cool steam into the stabilization zone (d). Accordingly, the present invention provides means for regulating and maintaining temperature profiles for highly specific reactions and under highly demanding reaction conditions.

The unique capabilities of the high temperature reactor of the present invention will be demonstrated hereinbelow by the utilization of such a reactor in the conversion of p-xylene to di-p-xylylene (DPX). It is to be clearly understood, however, that while this reactor is particularly suitable for the production of di-p-xylylene, it is considered equally applicable to other high temperature reaction systems requiring high reaction specificity.

In the conversion of p-xylene to the cyclic dimer, di-p-xylylene, there is involved essentially a multi-step reaction. The primary reaction involves the loss of a single hydrogen atom from p-xylene to yield the intermediate p-xylyl mono-radical, i.e.,

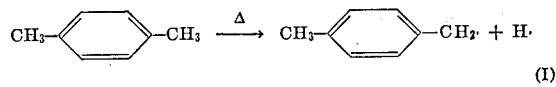

(I)

This first step is observable at temperatures as low as about 800° C., and the rate approximately doubles for each 20° C. rise. The desired secondary reaction involves the conversion of p-xylyl mono-radicals into p-xylylene diradicals. This is a believed to occur by disproportionation of a pair of p-xylyl monoradicals to a molecule each of p-xylene and a p-xylylene diradical as follows:

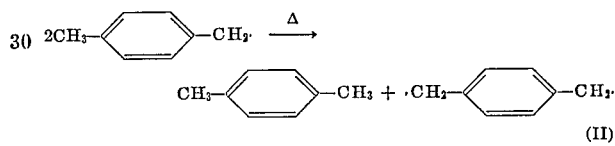

(II)

A secondary side reaction of some prominence is the combining of two p-xylyl radicals to form the linear dimer, di-p-tolyl-ethane:

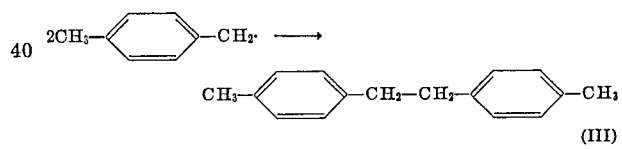

(III)

The presence of the linear dimer, along with other related side products such as toluene, benzene, cyclic tri-p-xylylene, 4,4'-dimethylstilbene, 2,6-dimethylanthracene and the like, in the effluent stream can be substantially minimized by maintaining a closely controlled temperature profile in the direction of flow. Since both primary and secondary reactions are involved, it is considered important to maintain the terminal portion of the reactor in such a manner as to favor completing the desired secondary reaction, i.e., the conversion of p-xylyl monoradicals to p-xylylene diradicals, and minimizing the residual concentration of intermediate and by-product materials in the effluent stream. Since the desired secondary reaction is more temperature dependent than the initial formation of p-xylyl monoradicals, it is considered critical to maintain the terminal portion of the reactor at at least the same if not a higher temperature than the initial portion, i.e., maintaining at least an essentially horizontal reaction temperature profile in the direction of flow. This is accomplished in the reactor of the present invention by introducing the carrier stream, which in the instance of DPX formation is superheated steam, at the terminal end of the reactor and passing said steam counter-currently to the direction of the reaction flow. In a preferred embodiment of the present invention, the terminal portion of the reactor is perforated as shown in FIGURE 1 to permit direct entry of a portion of the superheated steam into the terminal reaction zone thus providing a final heat kick and an immediate rise to a final high temperature plateau in the reaction temperature profile in the direction of flow. The perforations in the reaction chamber also have been found to disrupt the laminar boundary layer at the wall and create turbulence which aids the reaction. Therefore, to promote turbulence, the reaction chamber can be perforated throughout its entire length.

It has been found that the yield of the cyclic dimer, di-p-xylylene, rises markedly with the reaction stream temperature in the range of about 900°–1000° C. Due to a pronounced wall effect, however, a sharp rise in undesired side reactions is occasioned at temperatures greater than about 900° C. This appears to be mainly attributed to catalytic decomposition through contact with the hot reactor surfaces. For this reason, it is considered preferable that the reactor be constructed of materials having low or negligible catalytic activity at the reaction temperatures employed. Moreover, it is important that the reactor walls be maintained at the lowest temperatures which are compatible with the desired reaction stream temperatures. Accordingly, it has been found to be extremely important that the reactor wall temperatures closely match the local stream temperature throughout the reaction zone. This is accomplished quite conveniently in the reactor of the present invention upon the counter-current passage of the carrier stream past the reaction zone.

In order to further promote reaction specificity, the reaction zone is of such dimensions as to promote non-recycling, turbulent, plug flow through said zone. This can be accomplished by employing length to diameter ratios (L/D) greater than about 20:1 although any such ratio which provides non-recycling, turbulent, plug flow through the reaction zone is contemplated as within this invention.

Since p-xylene, the vapor phase precursor of DPX, is only one of a large number of possible decomposition products of p-xylene, the reactor must also be utilized in a manner which promotes reaction specificity. For example, low reactant partial pressures obtained through high carrier stream, e.g., steam, dilution must be employed although this lowers the allowable conversion per pass. The residence time within the reaction chamber is preferably less than about 100 milliseconds, most preferably from about 30 to about 60 milliseconds. Accordingly, the volume of the reaction zone is selected to give the desired residence time.

The incoming vaporous feed stream whether undiluted by the carrier stream or incompletely diluted is extremely sensitive to surface catalyzed decomposition. Small amounts of such decomposition at the reactor inlet, where the carrier stream and the p-xylene mix, leads to production of harmful amounts of hydrogen via the water-gas shift and related reactions. The hydrogen thus produced promotes demethylation and poisons the desired sequence of reactions. For this reason, it is considered important that the mixing of the incoming p-xylene feed stream with the counter-currently flowing carrier stream being conducted at temperatures below the mean reaction temperature.

Conventionally heated tubular reactors fail to meet the requirements necessary to obtain reaction specificity in high temperature reactions. Conventional transfer of heat through the reactor walls to the gas in order to achieve the desired temperature profile, especially at the unit heat fluxes needed to minimize surface area and maintain the required short residence time, inherently violates the requirement for minimum wall temperatures. Such heat transfer through the walls inherently involves wall temperatures significantly in excess of stream temperatures.

Furthermore, for the usual unheated reactor, deriving the needed sensible heat from the superheated carrier gas, the thermal losses and reaction endotherm would accentuate the need for further heat addition to maintain even a flat temperature profile. To achieve the preferable maximum temperature at the reactor outlet, a still larger heat input would be required within the reactor.

In actual operation, as best illustrated in FIGURE 1, steam, superheated to temperatures between about 1000° C. and 1050° C., is introduced through carrier steam inlet 20 into the annular passageway 14. The bulk of the steam passes along the annulus to the p-xylene feed inlet 16 where the latter vapor stream is injected through an insulated nozzle. Upon mixing of these two streams in the initial mixing zone (a), the desired initial reaction temperature is achieved quite rapidly. The mixed stream then passes through the primary reaction zone (b) maintained at temperatures between 930° C. and 975° C. and the secondary reaction zone (c) maintained at temperatures above about 950° C. Upon emergence from the effluent outlet 18, the vapor stream containing the reactive p-xylylene diradicals is chilled by addition of a stream of relatively cool steam through inlet 42 to arrest the gas phase reactions. The resultant stable gas mixture, at temperatures between about 450°–700° C. is then passed to a quenching zone (not shown) wherein the reactive diradicals are contacted by a fluid medium containing an inert organic liquid solvent such as p-xylene maintained at temperatures below about 300° C. wherein the reactive diradicals dimerize and form the cyclic dimer, di-p-xylylene.

Due to the counter-current passage of the carrier stream around the reaction zone, a small amount of heat transfer occurs. This transfer is sufficient in small scale reactors to balance out the reaction endotherm under normal operating conditions, thereby maintaining an essentially horizontal temperature profile in the direction of flow. In large reactors of this type, however, this mode of heat transfer would have little effect were it not for the embodiment illustrated in FIGURE 1 wherein the secondary or final reaction zone (c) is perforated by a plurality of apertures passing therethrough at intervals designed to admit predetermined portions of the high temperature carrier stream along the reaction flow path. In this manner the desired combination of reduced feed temperatures and elevated effluent temperatures can be achieved in the reactor without the attendant hot wall problems of the conventional heat transfer approach.

Another additional advantage of the reactor of the present invention is the fact that the high temperature carrier stream inlet and the effluent outlet are situated in close proximity with one another thereby substantially eliminating troublesome differential expansion effects, which can be significant at the elevated temperatures employed.

In lieu of the reactor as shown in FIGURE 1, it is also considered within the scope of the present invention to have a multi-stage reactor with separate carrier stream additions, at the same or different temperatures, to each stage as shown in FIGURE 2.

In FIGURE 2, there is shown a multi-stage high temperature reactor of the present invention. Each stage of said reactor is comprised of a multi-zoned reaction chamber 10 enveloped by an outer shell 12 as described with reference to FIGURE 1. The incoming feed is mixed in zone (a) of the first stage with the carrier stream which has traversed the annular space between the shell and reaction chamber. The mixed stream passes through the primary reaction zone (b) and is thereafter charged to the second stage via conduit 19. In the second stage, the effluent from the first stage is admixed in zone (c) with a fresh carrier stream of the same or higher temperature as that fed to the first stage and is then passed to the high temperature secondary reaction zone (d). The effluent stream from the second stage containing the reactive p-xylylene diradicals or the like can thereafter be treated in a similar fashion as described hereinabove. Automatic regulation of the temperature profile in both stages can be accomplished in a manner similar to that described with reference to FIGURE 1.

Referring now to FIGURE 3, there is shown several embodiments of the initial mixing zone contemplated within the present invention. The inlet 22 to the reaction chamber 10 is coaxial with the feed inlet 28, in the shell 12 and is proximately spaced therefrom to provide an initial mixing zone (a) for the incoming feed and countercurrently flowing carrier stream.

In the embodiment designated as (A), the inlet 22 is internally lipped to promote turbulent mixing of the incoming feed and carrier streams.

In the remaining embodiments designated (B), (C) and (D), the introduction of the feed stream and the mixing of the carrier stream therewith is distributed rather than concentrated at one location as in (A). This is accomplished, in accordance with the present invention, by providing a plurality of telescoping frusto-conical segments 29 intermittently inter-attached as by spot welding or other similar means to provide stage wise introduction of the carrier streams as shown in (B). Another embodiment as shown at (C) is the use of a porous or perforated inlet segment 30 as the initial mixing portion of the reaction chamber thereby allowing longitudinal distribution of the carrier stream.

Still a further embodiment as shown at (D) is the use of a conical entrance or mixing zone 32 to the reaction chamber having a plurality of tangentially distributed apertures therein.

In each of the above embodiments, the incremental or distributed addition of the carrier streams serves as a means of raising the temperature of the feed stream and its immediate surroundings more gradually thereby preventing decomposition of the feed.

In another aspect of the present invention, it has been found that most commercially available alloys and particularly those of the iron-nickel-chromium family promote catalytic degradation of the feed stream at the extremely high temperatures employed in thermal cracking reactions. This is believed to be due to the poor oxidation resistance of such alloys at the high temperatures employed in these reactions. Due to this deficiency in oxidation resistance, the alloys tend to form metallic oxide scales which have been found to possess catalytic activity promoting decomposition of the feed streams upon contact with the hot reactor surfaces.

Quite surprisingly, it has been found in the present invention, that the addition of a critical amount of rare earth metals to iron-nickel-chromium alloy compositions results in the formation of a stable oxide film which exhibits relatively insignificant catalytic decomposition of the feed streams at the reaction temperatures employed. More specifically, it has been found that the addition of rare earth metals such as cerium, praseodymium, neodymium, promethium, samarium, europium, gadolinium, terbium, dysoprosium, holmium, erbium, thulium, ytterbium, lutetium, mixtures thereof such as that commonly known as "Mischmetal," and also associated elements such as yanthanum, yttrium and scandium, in active amounts not exceeding the solubility limit of the rare earth metal in the alloy composition and preferably, the rare earth metal being incorporated in said alloy in amounts of from about 0.001 to about 0.3 percent by weight result in alloys in which the metallic oxides which are formed at elevated temperatures exhibiting a substantially non-catalytic or passive surface. It was found that no significant non-catalytic effect was obtained in instances where the rare earth metals were present in amounts less than about 0.001 percent. Above the solubility limit of the rare earth metals in the iron-nickel chromium alloys employed, i.e., about 0.3 percent by weight, it was found that catalytic activity was again initiated. This is possibly due to precipitation of the rare earth metals in the grain boundaries of the alloy which could promote the spalling of the oxide films thereby exposing new and catalytically-active surfaces to the feed stream.

An alloy, heretofore unavailable, was developed in the present invention to provide substantially no catalytic activity and high oxidation resistance at the temperatures employed in thermal cracking reactions. This alloy consists essentially of:

| | Percent |
|---|---|
| Chromium | 28–32. |
| Nickel | 18–22. |
| Carbon | 0.20–0.60. |
| Molybdenum | Up to about 0.5. |
| Manganese | Up to about 2.0. |
| Silicon | Up to about 2.0. |
| Rare earth metal | 0.001 to 0.3. | with the remainder of said alloy being iron.

A convenient method of estimating the degree of catalytic activity of an alloy is to conduct a high temperature thermal cracking reaction in the presence of a wire mesh or thin ribbon-like network of the alloy, and to measure the rate of gas production under a standard set of experimental conditions. The gas production rate is synonymous with the decomposition rate of the feed stream. Samples of the above described alloy were tested both with and without the presence of rare earth metal in the alloy composition, designated below respectively as alloys A and B. p-Xylene was pyrolyzed at a temperature of 950° C. and a contact time of 0.06 seconds. The p-xylene was fed to the reactor, which was packed with wire mesh made from the appropriate alloy compositions, in a steam diluent at a steam/p-xylene ratio of 120/1. The moles of gas produced per mole of xylene fed to the reactor are shown below:

| Alloy | Moles gas/mole xylene feed |
|---|---|
| A. (0.11% mischmetal) | 0.6 |
| B. (No rare earth metal) | 15.0 |

The same alloys were subjected to oxidation tests in a muffle furnace. The samples, in the form of pairs of ¾" diameter discs, each approximately ⅛" thick were suspended on a horizontal rod passing through ⅛" diameter holes at their centers. The rod on which the test discs were skewered was mounted along the axis of the muffle tube. The muffle tube necks down at one end to a small diameter which extends outside of the furnace where it is attached to a rubber tube which supplies a steady small flow of dry air which enters the heated section and passes over the samples. The open opposite end of the muffle tube is partially filled with a refractory wool-like material to prevent loss of heat by radiation.

The samples were brought to 2100° F. for periods of 20 hours and then were rapidly cooled in air and weighed. After weighing, the samples were returned to the furnace for another 20 hour period at 2100° F. and the cycle was repeated for a total of eighty hours. The individual sample weights after each heating period are compared with their original weights before the start of the test. Results are reported as milligrams weight change per square centimeter of original exposed disc area. Thus, negative values represent over-all weight losses due to scaling whereas positive values represent overall weight gains due to oxidation and formation of a stable, well bonded oxide scale.

2,100° F. AIR OXIDATION TESTS

| Alloy | Overall weight change mg./cm.² Period | | | |
|---|---|---|---|---|
| | 1 | 2 | 3 | 4 |
| | Total Hours | | | |
| | 20 | 40 | 60 | 80 |
| A (0.11% mischmetal) | +1.8 | +2.9 | +3.8 | +6.5 |
| B (no rare earth metal) | −1.7 | −3.0 | −5.2 | −6.1 |

Thus it can be readily seen that the alloy composition as above defined is superior to the same alloy composition without the rare earth metal addition in exhibiting both noncatalytic activity and high oxidation resistance at thermal cracking temperatures.

Another alloy, heretofore, unavailable, was also developed in the present invention to provide substantially no catalytic activity at the temperatures employed in thermal cracking reactions and consists essentially of:

|  | Percent |
|---|---|
| Chromium | 20–23. |
| Iron | 17–20. |
| Rare earth metal | 0.001–0.3. |
| Carbon | 0.05–0.20. |
| Molydenum | 8–10. |
| Cobalt | Up to about 2.5. |
| Tungsten | Up to about 1.0. |
| Manganese | Up to about 1.0. |
| Silicon | Up to about 1.0. | with the remainder of said alloy being nickel.

As can be seen in Table I presented hereinbelow, the addition of critical amounts of rare earth metals to iron-nickel-chromium alloy compositions provided alloy compositions especially useful for high temperature thermal cracking applications such as thermal cracking reactors, high-temperature superheaters and the like. A comparison of the moles of gas formed per mole of xylene fed to the reactor clearly demonstrates that only when an active amount of rare earth metal is present below its solubility limit in the particular alloy, usually between 0.001 and 0.3 percent by weight, is the substantially non-catalytic activity of the composition obtained. It can be seen that as soon as the critical amount is exceeded (see Table I, Alloy E) catalytic activity is immediately restored.

preventing decomposition of the p-xylene, although there may also be employed other inert diluents as, for example, nitrogen, argon and like inert gases. Thus, the total pressure of the system depends on the desired operating partial pressure of the p-xylene, and the amount of steam and/or other diluents employed. When no diluents are are employed, the pyrolysis reaction is preferably carried out at total pressures of 1 to 10 mm. Hg. Thus. in this process, it is possible to operate at total pressures even up to atmospheric pressure or higher.

The amount of steam present in this process is not narrowly critical but when employed it is preferably present in an amount of at least about 50 moles per mole of p-xylene and generally between about 50 to 300 moles per mole of p-xylene although between about 100 to about 200 moles per mole of p-xylene are most preferred. Excess steam however is not detrimental to the process.

Pyrolysis of the p-xylene is conveniently conducted by vaporizing the p-xylene and passing it through a high temperature thermal cracking reactor as hereinbefore described for a short period of time. Time of contact in the radical, p-xylylene, but not so long that charring or complete decomposition occurs. Contact time depends to a great degree on the particular temperature selected for pyrolysis; the lower the temperature the longer the permissible contact time and vice versa. At most desirable

TABLE I

| Alloy | Alloy composition | | | | | | | | | | | Rare Earth Metal | Moles off gas/moles feed |
|---|---|---|---|---|---|---|---|---|---|---|---|---|---|
|  | Cr | Ni | Fe | C | Co | Cu | Mo | W | Mn | Si | Cb and Ta |  |  |
| A | 30 | 20 | 48 | 0.4 |  |  |  |  | 1.0 | 1.0 |  | 0.11 | 0.6 |
| B | 30 | 20 | 48 | 0.4 |  |  |  |  | 1.0 | 1.0 |  |  | 15.0 |
| C | 22 | 48 | 18 | 0.2 | 1.5 |  | 9.0 | 0.6 | 0.5 | 0.5 |  | 0.15 | 0.4 |
| D | 22 | 48 | 18 | 0.2 | 1.5 |  | 9.0 | 0.6 | 0.5 | 0.5 |  |  | 2.1 |
| E | 22 | 48 | 18 | 0.2 | 1.5 |  | 9.0 | 0.6 | 0.5 | 0.5 |  | 0.32 | 2.2 |
| F | 20 | 29 | 44 | 0.07 |  | 3.0 | 2.0 |  | 0.75 | 1.0 | 0.6 | 0.2 | 0.22 |
| G | 20 | 29 | 44 | 0.07 |  | 3.0 | 2.0 |  | 0.75 | 1.0 | 0.6 |  | 15 |
| H | 26 | 35 | 36 | 0.4 |  |  | 1.2 |  | 1.0 | 1.2 |  |  | 15 |
| I | 25 | 20 | 55 | 0.25 |  |  |  |  |  |  |  |  | 16 |
| J | 16 | 76 | 72 | 0.04 |  | 0.1 |  |  | 0.2 | 0.2 |  |  | 21 |

In still another aspect of the present invention, it has been found that the formation of cyclic di-p-xylylene is greatly enhanced by generating the reactive p-xylylene diradicals having the formula $$\cdot H_2C-\!\!\left\langle\!\!\bigcirc\!\!\right\rangle\!\!-CH_2\cdot$$

by pyrolysis of p-xylene at temperatures from about 900° C. to about 1000° C. in an environment comprised of an iron-nickel-chrome alloy composition containing an active amount of a rare earth metal therein, and thereafter condensing the diradicals thus formed in a fluid medium containing an inert organic solvent. The vapors containing the reactive diradicals selectively condense in the solvent into the cyclic dimer, di-p-xylylene in much higher yields than in any other known process.

The reactive diradical, p-xylylene is generated in this process by pyrolysis of para-xylene at a temperature of at least 900° C. and preferably from about 930° C. to about 1000° C. At temperatures above about 1000° C. some decomposition of the reactive diradical is occasioned which undesirably affects the resultant yields of product. Low partial pressures of the p-xylene are desirable in this process, preferably such that the p-xylene partial pressure is between about 0.1 and 20 mm. Hg, with optimum conditions generally being secured at a partial pressure of the p-xylene of about 1 to 10 mm. Hg.

While the presence of an inert diluent in this process is not critical, it is often desirable for use in this process in order to reduce the partial pressure of the p-xylene and make it possible to operate at higher total pressures. It has been found that steam is a particularly desirable inert diluent in this process in that it permits operation at atmospheric pressure and has a protective effect in conditions of about 975° C. contact times are preferably between about 0.03 to 0.06 second. Seldom would it be desirable to have a contact time greater than 0.1 second. At the higher operating temperatures, contact times of 0.03 second or shorter may at times be indicated.

Condensation of the p-xylylene diradicals into the di-p-xylylene is accomplished in the presence of an organic solvent. In order to stabilize the composition of the pyrolysate vapors and prevent disproportionation of diradical and p-xylene back to monoradical it is preferable to cool to about 500° C. but not below about 400° C. in order to avoid dropping below the condensation temperature of the reactive diradical before it is absorbed in the organic solvent. Cooling to below the ceiling condensation temperature in the absence of the organic solvent causes almost spontaneous polymerization of the reactive diradical to poly-p-xylylene. This ceiling condensation temperature is generally below about 400° C. depending somewhat on the operating pressure. However, in the vaporous state, the reactive diradical is relatively stable and does not polymerize.

The cooling of the pyrolysate vapors may be accomplished in any of several convenient means. For instance, internal or external condensers, cooling coils, tubes or the like can be employed immediately after the pyrolysis zone, or if desired, natural cooling caused by long runs of air cooled tubing or piping from the pyrolysis zone to the condensing medium can be used. It is also possible to mix the organic solvent condensing medium in the vapor state in a suitable manner or mixing chamber with the pyrolysate vapors as another method. Preferably, direct cooling means, e.g., injection of a cool vapor into the pyrolysate vapors, are employed in order to rapidly reduce the reaction temperatures thereby avoiding undesired shifts in stream composition.

It is essential in this process that the condensation of the cooled vaporous diradical be carried out in the presence of a fluid medium of an inert organic solvent. One of the most preferred solvents for reasons hereinafter discussed is p-xylene itself. However, if desired, other aromatic materials such as o-xylene, m-xylene, toluene, cumene, benzene, methyl-naphthalene, o-dichlorobenzene, acetic acid, 1,2-di-p-tolylethane, mineral oil, diphenylmethane, 1,2-diphenylethane, heptane, decahydronaphthalene, and the like and preferably those having an atmospheric boiling point between about 100° C. and 350° C. can be suitably employed.

The di-p-xylylene product forms on the condensation of the vaporous diradicals in the presence of the fluid medium. It is not essential however that the fluid medium be in the liquid state. While this is most desirable, the condensation can be accomplished equally as well by mixing the pyrolysate vapors with vaporous aromatic solvent and simultaneously condensing the total mixture to the liquid state for recovery of the product.

Suitable gas scrubbers or spray tanks can be used to remove and condense the p-xylylene diradicals into the di-p-xylylene in this process. Gas scrubbing devices are particularly desirable in continuous operation, and with the use of such very high boiling organic solvents as mineral oil where the di-p-xylylene can be recovered by distillation from the solvent.

When the cooled pyrolysate vapors of the reactive diradical are collected in a liquid medium, merely bubbling or dispersing the vapors below the liquid level of the aromatic solvent is also adequate to cause the p-xylylene to dimerize to the di-p-xylylene and be recovered from the solvent solution. The bath into which these vapors are condensed can be maintained at any temperature below about 300° C., and preferably from 100° to 250° C. Thus, when employed herein, the term "fluid media" is intended to cover both the liquid or gaseous state of the solvent medium in which the pyrolysate vapors are collected.

Recovery of the di-p-xylylene is relatively easy. It can, for instance, readily be recovered by removing a majority of a lower boiling solvent medium by distillation and then crystallizing the di-p-xylylene from the remaining solvent by cooling and filtering off the crystallized di-p-xylylene.

The product obtained by this process generally has a sharp melting point of 284°–285° C. and is free of other possible condensation products such as 1,2-di-p-tolylethane

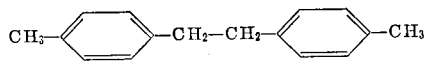

and cyclo-tri-p-xylylene

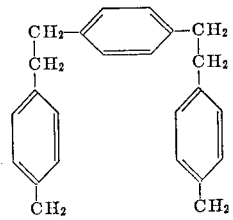

which are contained in the filtrate of this method. These can be recycled to the pyrolysis zone with additional p-xylene inasmuch as they also are cracked back to the p-xylylene diradical in subsequent pyrolysis.

In the preferred method of operating this process, p-xylene and steam are fed to an atmospheric pressure reactor of the type hereinbefore described, packed with a mesh of the alloy composition above defined, and maintained at 950° C. The p-xylene and steam flow rates are adjusted so as to give a contact time of about 0.03 to 0.06 second and a p-xylene partial pressure of 1.0 to 10 mm. Hg. The pyrolysate vapors are cooled at the outlet of the pyrolysis zone to a temperature of about 400–700° C. and then passed into a quenching bath of boiling organic solvent where the condensation of the diradical to the cyclic dimer takes place.

The remaining uncondensed vapors are subsequently condensed. The aqueous layer is decanted. The condensed p-xylene is recycled. The solution containing the dimer is concentrated by flashing or reduced pressure distillation to about one-tenth its original volume. On cooling the di-p-xylylene crystallizes from the p-xylene solution in high purity and is separated from the mother liquor by filtration or by centrifugation, washed and dried.

It is, of course, realized that the dimer recovery process can be conducted either batch-wide or continuously. The use of p-xylene as the condensation medium is highly desirable in the continuous system inasmuch as it can be recycled within the system serving not only as the reactant but also as the condensation medium and problems of handling a separate solvent are avoided.

It has been found in this invention that the yield of the cyclic dimer, di-p-xylylene is greatly enhanced whereas the decomposition rate as perhaps best observed by a sharp decrease in the moles of by-product gas per mole of p-xylene is greatly decreased when the process as above described is conducted in an environment comprised of an iron-nickel-chromium alloy containing therein an active amount of a rare earth metal or mixture as hereinbefore described not exceeding the solubility limit of the rare earth in the alloy composition. Preferably, the rare earth metal constituent is incorporated in such alloy composition in amounts of from about 0.001 to about 0.3 percent by weight.

An environment comprised of the alloy composition can be attained through use of a packing comprised of said alloy in a high temperature reactor, preferably of the type described herein. When so employed, the alloy can take the form of a steel wool or woven mesh packing. The alloy can also be present as the material used in the construction of the reaction chamber or as a liner in the reaction chamber although any means or form for providing an environment wherein the formation of the reactive p-xylylene diradicals can occur in the presence of such an alloy composition as described is contemplated as within this invention.

As can be seen from Table II below, under substantially the same operating conditions, not only are the yields increased but also the amount of off-gas formation attributed to decomposition of the feed stream is reduced, when the reaction is conducted in the presence of an iron-nickel-chromium alloy containing from about 0.001 to about 0.3 percent of a rare earth element as hereinbefore described. See Table I for a description of the alloys listed in Table II. The data shown in Table II was obtained by pyrolzing p-xylene in a steam diluent in a molar ratio of steam to p-xylene of 120:1 at 950° C. in a quartz pyrolysis tube packed with mesh-like lathe trimmings of the respective alloys. The pyrolysis stream was fed to the packed reactor so that the stream contacted the packing upon its passage through the reactor. The reactive diradicals were formed in contact with said packing and thereafter passed to a subsequent quenching zone wherein the diradicals were condensed in a fluid medium containing an inert organic solvent maintained at temperatures below about 300° C. It can be seen that only when the rare earth metals are present in the critical amounts hereinabove specified are the yields of cyclic dimer increased and the rate of decomposition substantially decreased.

As can be seen in Table II, an alloy, composition particularly effective for use in a high temperature reactor for the preparation of di-p-xylylene is alloy F which is an iron base alloy consisting essentially of:

| | Percent |
|---|---|
| Chromium | 20–23 |
| Nickel | 25–35 |
| Carbon | 0.05–0.15 |
| Rare earth metal | 0.001–0.3 |
| Molybdenum | 1–3 |
| Copper | Up to about 3.0 |
| Manganese | Up to about 1.0 |
| Silicon | Up to about 1.0 |
| Columbium and tantalum | Up to about 1.0 | and the remainder of said alloy being iron.

TABLE II

| Alloy | Reaction Temperature (° C.) | Molar Ratio Steam Xylene | Percentage Yield | Moles By-Product Gas/Mole Xylene |
|---|---|---|---|---|
| A | 950 | 120/1 | 7.0 | 0.6 |
| B | 950 | 120/1 | 0 | 15.0 |
| C | 950 | 120/1 | 8.5 | 0.4 |
| D | 950 | 120/1 | 5–6 | 2.1 |
| E | 950 | 120/1 | 6 | 2.2 |
| F | 950 | 120/1 | 11.1 | 0.2 |
| G | 950 | 120/1 | 0 | 15 |

What is claimed is:

1. A high temperature reactor comprised of a reaction chamber enveloped by an outer shell to form an annular passageway therebetween; said reaction chamber being open at the feed end thereof, having an effluent outlet at the opposed end thereof and a plurality of apertures inwardly spaced from said effluent outlet providing open communication with said annular passageway, said enveloping shell having an open feed inlet at one end thereof and a carrier stream inlet at the opposed end thereof entering said shell proximately spaced from the effluent outlet of the reaction chamber enabling the carrier stream to flow in the annular passageway counter-currently to the direction of flow of the reactant stream in the reaction chamber thereby maintaining an essentially horizontal reaction temperature profile in one portion of said reaction chamber and to enter said plurality of apertures to provide an immeditae rise in temperature to a final high temperature plateau at the terminal portion of said reaction chamber; said enveloping shell being secured to the reaction chamber at the effluent outlet thereof and the feed inlet of said enveloping shell being proximately spaced from the open feed end of said reaction chamber to provide an initial mixing zone for the incoming feed and counter-currently flowing carrier stream.

2. High temperature reactor as claimed in claim 1 wherein the initial mixing zone is internally lipped to promote turbulent mixing.

3. A high temperature reactor comprised of a reaction chamber enveloped by an outer shell to form an annular passageway therebetween; said reaction chamber being perforated with a plurality of apertures at the feed end thereof providing open communication with said annular passageway, an effluent outlet at the opposed end thereof, a plurality of apertures inwardly spaced from said effluent outlet providing open communication with said annular passageway, and an imperforate intermediate zone separating the perforations at said feed end and said effluent outlet; said enveloping shell being secured to the effluent outlet of said reaction chamber, having an open feed inlet communicating with the feed end of said reaction chamber and a carrier stream inlet at the opposed end thereof entering said shell proximately spaced from the effluent outlet of the reaction chamber thereby enabling a carrier stream to flow in the annular passageway counter-currently to the direction of flow of the reactant stream in the reaction chamber to maintain an essentially horizontal reaction temperature profile in said imperforate intermediate zone of said reaction chamber, to enter the plurality of apertures at the feed end of said reaction chamber to mix with the reactant stream and to enter the plurality of apertures inwardly spaced from said effluent outlet to provide an immediate rise in temperature to a final high temperature plateau at the terminal portion of said reaction chamber.

References Cited

UNITED STATES PATENTS

| 1,875,024 | 8/1932 | Kryzanowsky | 23—288.3 |
| 2,976,128 | 3/1961 | Latham et al. | 23—259.5 |
| 3,311,668 | 3/1967 | Spence et al. | 260—668 |

JAMES H. TAYMAN, JR., *Primary Examiner.*